US005107300A

United States Patent [19]

Miyake et al.

[11] Patent Number: 5,107,300

[45] Date of Patent: Apr. 21, 1992

[54] IMAGE FORMING APPARATUS INCLUDING MEANS FOR CONTROLLING THE AMOUNT OF LIGHT EXPOSURE

[75] Inventors: Hiroyuki Miyake, Inagi; Yutaka Komiya, Tokyo, both of Japan

[73] Assignee: Canon Kabushiki Kaisha, Tokyo, Japan

[21] Appl. No.: 554,161

[22] Filed: Jul. 19, 1990

Related U.S. Application Data

[63] Continuation of Ser. No. 246,946, Sep. 20, 1988, abandoned, which is a continuation of Ser. No. 942,944, Dec. 17, 1986, abandoned, which is a continuation of Ser. No. 605,694, Apr. 30, 1984, abandoned.

[30] Foreign Application Priority Data

May 6, 1983 [JP] Japan ................................ 58-78195

[51] Int. Cl.[5] ..................... G03G 21/00; G03B 27/72; G03B 27/74

[52] U.S. Cl. ..................................... 355/208; 355/68; 355/69; 355/214

[58] Field of Search ................. 355/200, 208, 214, 68, 355/69

[56] References Cited

U.S. PATENT DOCUMENTS

| | | | |
|---|---|---|---|
| 3,947,117 | 3/1976 | Basu et al. | 355/68 |
| 4,153,364 | 5/1979 | Suzuki et al. | 355/214 |
| 4,215,930 | 8/1980 | Miyakawa et al. | 355/208 |
| 4,239,374 | 12/1980 | Tatsumi et al. | 355/214 |
| 4,248,528 | 2/1981 | Sahay | 355/308 |
| 4,306,804 | 12/1981 | Sakamoto et al. | 355/214 X |
| 4,358,520 | 11/1982 | Hirayama | 355/208 X |
| 4,460,270 | 7/1984 | Watai et al. | 355/208 X |
| 4,502,777 | 3/1985 | Okamoto et al. | 355/208 |
| 4,519,695 | 5/1985 | Murai et al. | 355/208 X |
| 4,564,287 | 1/1986 | Suzuki et al. | 355/208 |
| 4,831,415 | 5/1989 | Kasuya | 355/208 |

*Primary Examiner*—Fred L. Braun

*Attorney, Agent, or Firm*—Fitzpatrick, Cella, Harper & Scinto

[57] ABSTRACT

An image formation apparatus such as a copying machine has a standard white plate, an optical system for forming a latent image on a photosensitive drum, a photosensor such as a linear image sensor for detecting the amounts of light reflected from the standard white plate and an original, and a control section including a CPU and an exposure control circuit and/or a bias control circuit for controlling the light exposure amount or the developing bias voltage in accordance with the difference between the light amounts from the standard white plate and the original.

28 Claims, 7 Drawing Sheets

IMAGE FORMING APPARATUS INCLUDING MEANS FOR CONTROLLING THE AMOUNT OF LIGHT EXPOSURE

This application is a continuation of application Ser. No. 07/246,946 filed Sept. 20, 1988, now abandoned, which was a continuation of application Ser. No. 06/942,944 filed Dec. 17, 1986, now abandoned, which was a continuation of application Ser. No. 06/605,694 filed Apr. 30, 1984, now abandoned.

BACKGROUND OF THE INVENTION

1. Field of the Invention

The present invention relates to an image formation apparatus for optimizing image formation conditions in accordance with an original density and for automatically controlling the image density.

2. Description of the Prior Art

In a conventional image formation apparatus such as a copying machine, an original density is detected, and image formation conditions such as a charging condition, an exposure condition or a developing condition are controlled in accordance with the detection result obtained, thereby automatically controlling the image density.

Such automatic control of the image density can be performed by prescanning for light exposure amount correction after the pre-rotation of the photosensitive drum and correcting the light exposure amount in accordance with the result obtained by prescanning. However, according to this method, the photosensitive drum is first pre-rotated so as to render the surface thereof electrostatically uniform for standardization of the image formation conditions, and then prescanning for light exposure amount correction is performed. Therefore, due to the time for drum pre-rotation and light exposure amount correction, the copying operation for the first copy is delayed. Another method may be adopted to perform automatic control of the image density. According to this method, after the surface potential of the photosensitive drum has been adjusted to an optimum value, prescanning is performed to determine the amount of light illumination. The amount of illumination light determined in this manner is added to the amount of light obtained by standardization of the image formation conditions by control of the surface potential of the photosensitive drum. Then, the light exposure amount is thus controlled in accordance with the obtained sum. However, in this latter method, although the precision of the light exposure amount control is good, the copying operation for the first copy is again delayed.

SUMMARY OF THE INVENTION

The present invention has been made in consideration of this and has as its object to provide an image formation apparatus which can automatically control image density with good precision and accuracy.

It is another object of the present invention to provide an image formation apparatus which can control image density without causing a delay in the image forming operation for the first copy.

It is still another object of the present invention to provide an image formation apparatus which can control image density by comparing a standard light amount with a light amount reflected from the original image.

It is still another object of the present invention to provide an image formation apparatus which can control image density in parallel with the standardization of the image formation conditions.

The above and other objects and features of the present invention will be described in detail hereinafter.

DETAILED DESCRIPTION OF THE PREFERRED EMBODIMENTS

The preferred embodiments of the present invertion will now be described with reference to the accompanying drawings.

Figure 1:
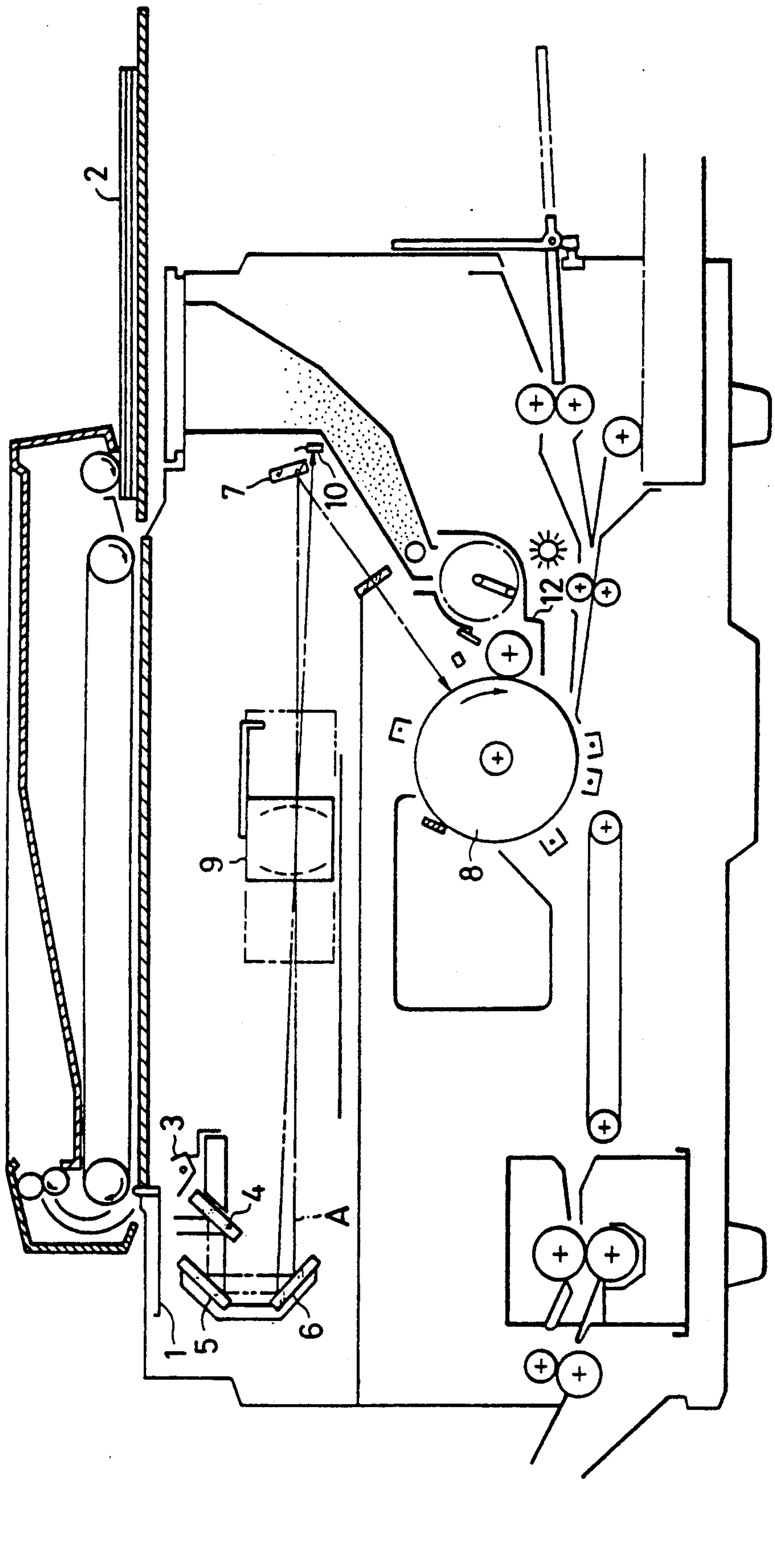
FIGS. 1 and 2 are schematic views showing the construction of a machine according to the present invention.
Figure 2:
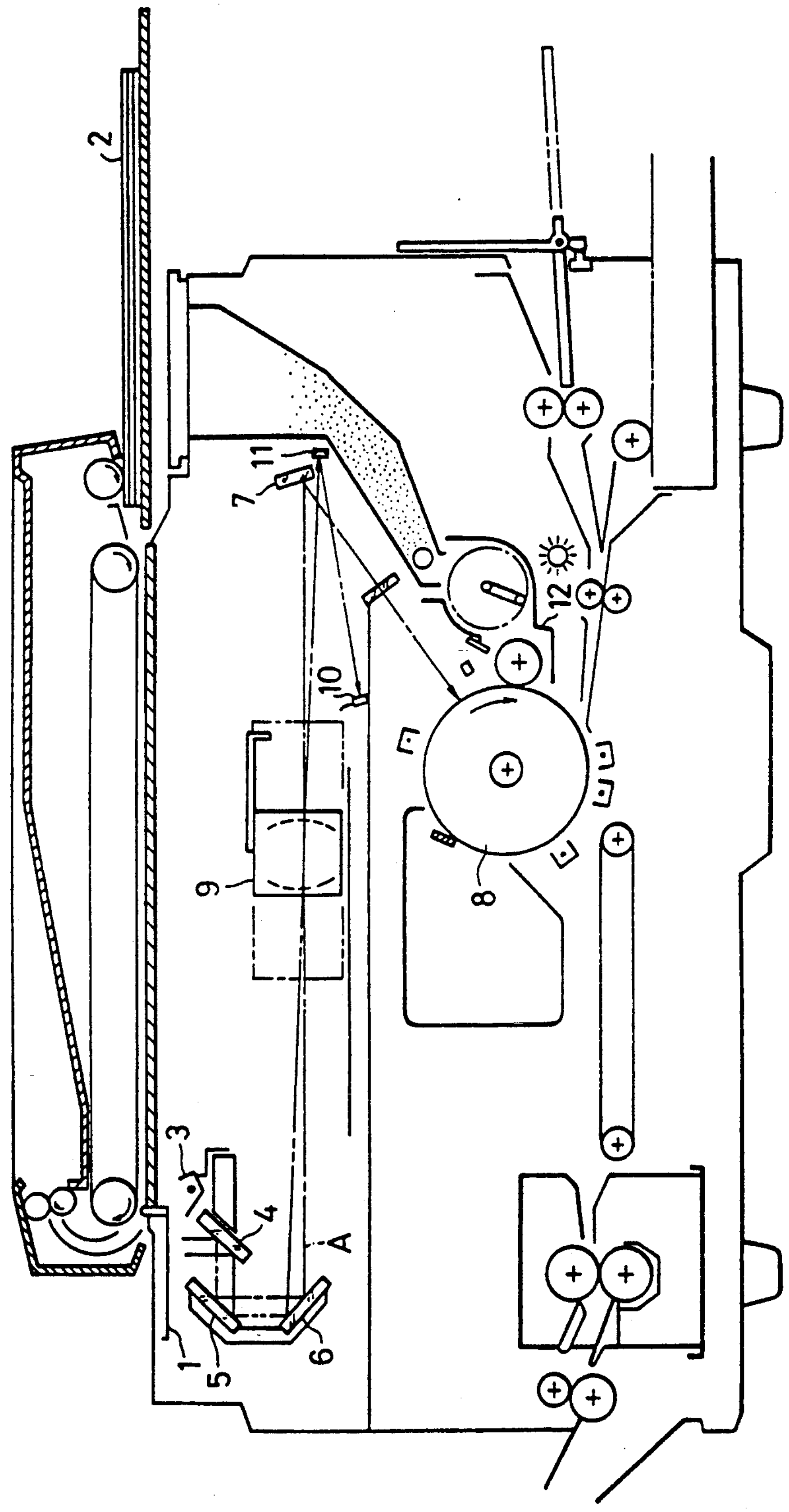

FIGS. 1 and 2 are schematic views showing the construction of a copying machine according to the present invention. A standard white plate 1 is arranged at the upper left corner of a housing. Light emitted from a halogen lamp 3 and reflected by an original 2 to be copied is guided toward a photosensitive drum 8 through mirrors 4, 5, 6 and 7 and an imaging lens 9. A photosensor 10 as a photodetector is arranged at a position slightly deviated from the imaging light path A. In the case shown in FIG. 1, the photosensor 10 is arranged near the mirror 7. In the case shown in FIG. 2, the photosensor 10 is arranged at the position at which the light image reflected by an auxiliary mirror 11 near the mirror 7 is focused.

When the operation is started in the copying machine having the above construction, the photosensitive drum 8 is pre-rotated to stabilize the photosensitive characteristics. Thereafter, in order to optimize a dark portion surface potential $V_D$ of the photosensitive drum 8, the surface potential $V_D$ is detected to control (to be referred to as $V_D$ control hereinafter) the primary charger. Then, in order to optimize a bright portion surface potential $V_L$ in accordance with the reflected light from the standard white plate 1, the surface potential $V_L$ is detected and the firing voltage of the halogen lamp 3 is controlled (to be referred to as $V_L$ control hereinafter) and the amount of light illumination is determined. At the same time, to control image density, the photosensor 10 measures the amount of light reflected from the standard white plate 1 and that from the original 2, and calculates the correction value of the amount of light illumination in accordance with the difference between the two amounts. The amount of light illumination obtained by $V_L$ control is superposed on this correction value so as to finally determine the amount of light illumination for copying, that is, the light exposure amount to be supplied to the photosensitive drum 8. The image density is thus controlled. When the copying operation is completed, the photosensitive drum 8 is post-rotated so as to be electrostatically cleaned.

Figure 3:
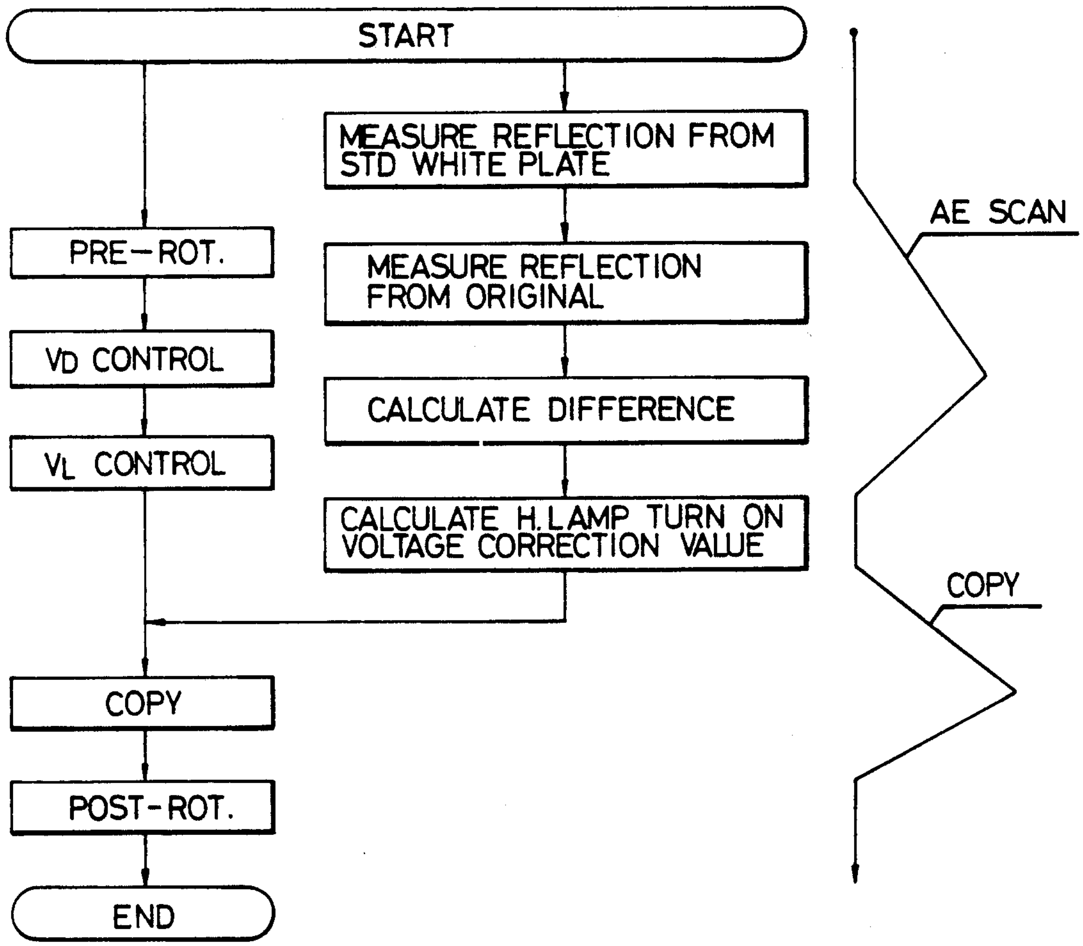
FIG. 3 is a flow chart for explaining the operation sequence for automatic control of the image density in the copying machine according to the present invention.
Figure 4:
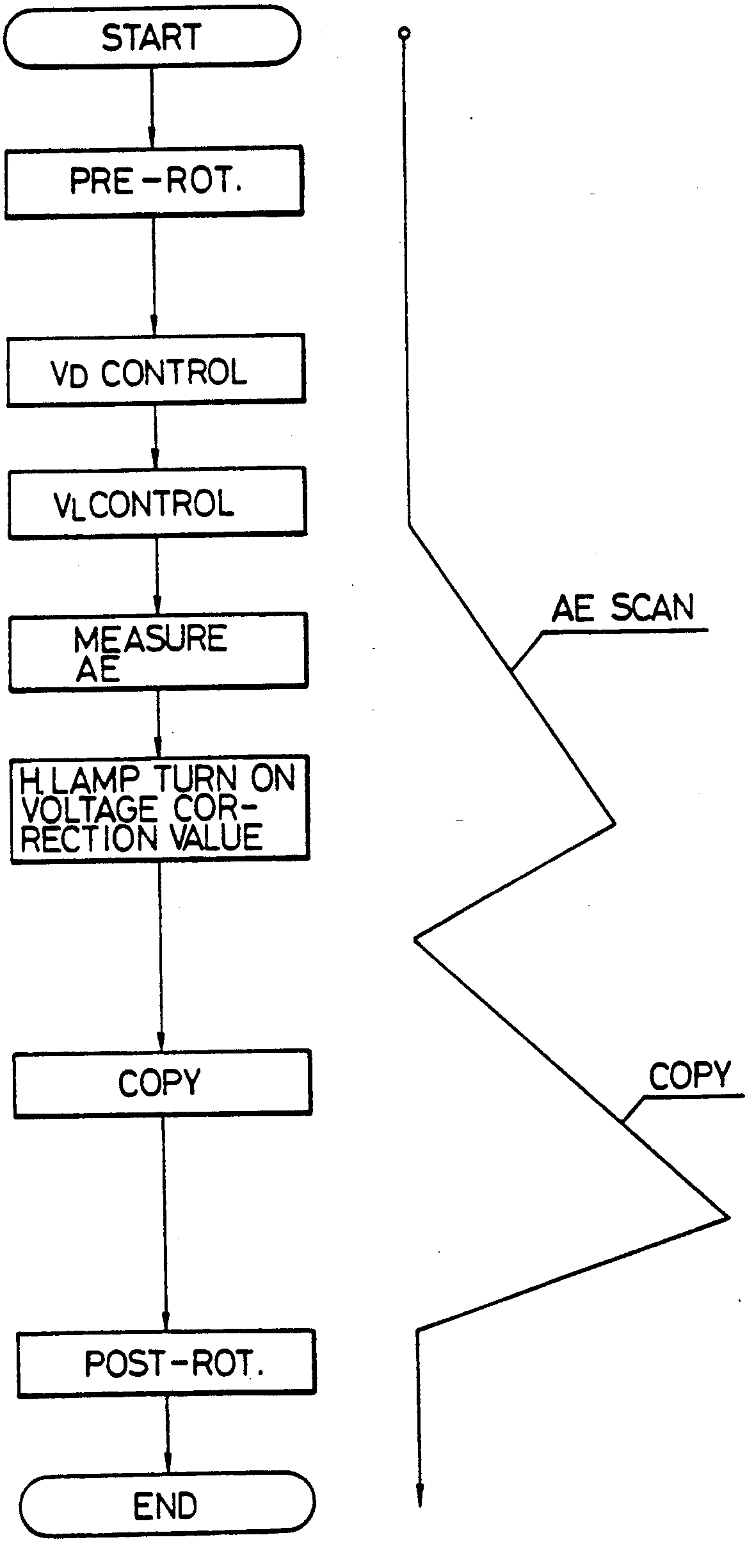
FIG. 4 (PRIOR ART)
FIG. 4 is a flow chart for explaining the operation sequence for automatic control of the image density in a conventional copying machine.

In this manner, a copy can be reproduced by AE control. As shown in the flow chart in FIG. 3, scanning for AE control is performed during the pre-rotation of the photosensitive drum 8. Therefore, the production of the first copy is not delayed. In contrast to this, when a potentiometer is used in place of the photosensor 10, prescanning for performing AE control is performed after $V_D$ and $V_L$ control, as shown in FIG. 4. Therefore, production of the first copy is delayed in this case.

When the photosensor 10 as shown in FIG. 1 is arranged near the mirror 7, the amount of reflected light carrying defocused image information through the imaging lens 9, i.e., the average amount of light of the portion having a relatively great width, is measured. Therefore, as shown in FIG. 2, when the reflected light image is reflected by the auxiliary mirror 11 and the photosensor 10 is arranged at the position at which the reflected image is focused, the reflected light image from the original 2 is formed on the photosensor 10. Therefore, the reflected light amounts from the background and printed portions of the original 2 can be discriminated with high precision.

Figure 5:
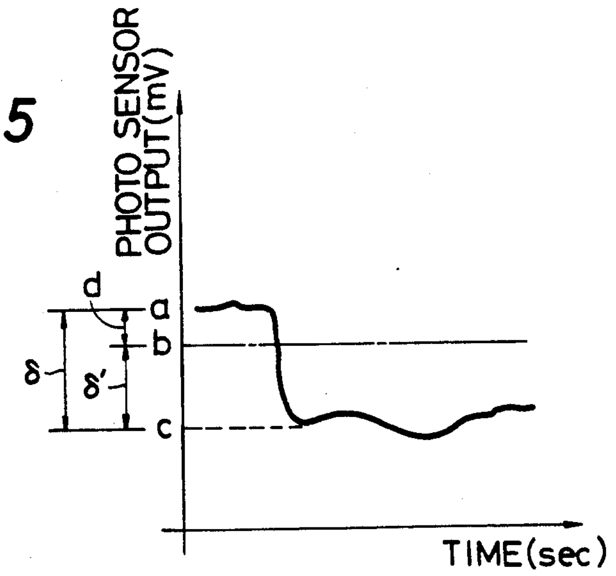
FIGS. 5 and 6 are charts showing the photosensor outputs.
Figure 6:
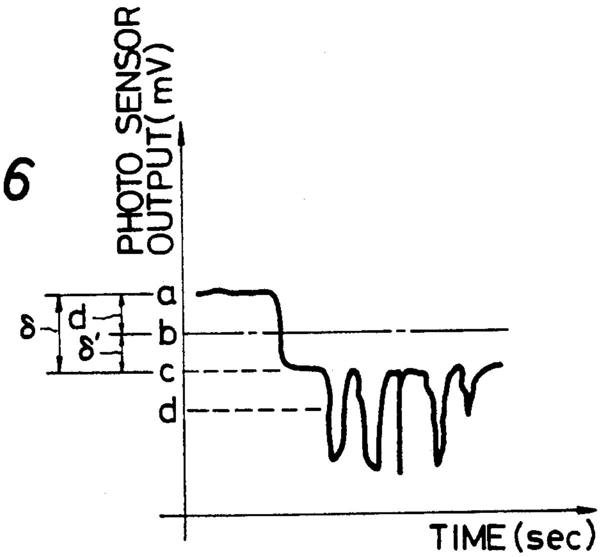
Figure 7:
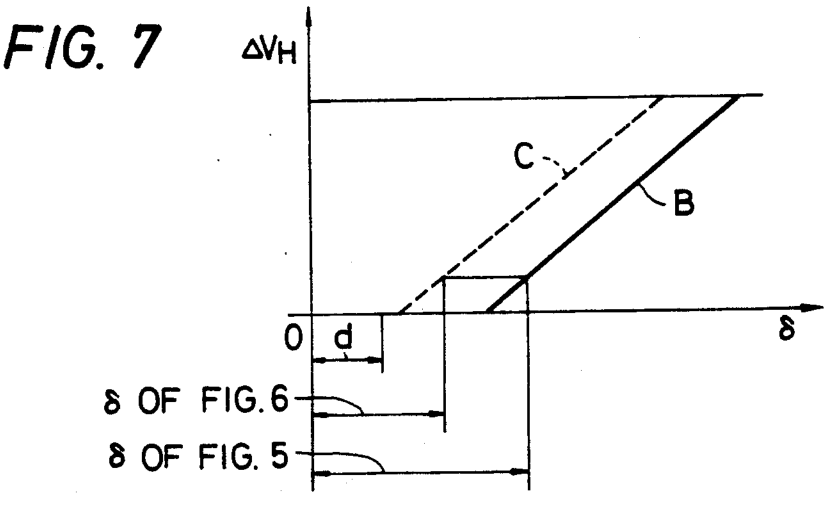
FIG. 7 is a graph showing the difference in the reflected light amounts as a function of correction value of the firing voltage of a halogen lamp.

FIGS. 5 and 6 show the output (voltage outputs) from the photosensor 10 in both cases. FIG. 7 shows the difference δ (voltage signal) between the reflected light amount from the standard white plate 1 and that from the original 2 which are measured by the photosensor 10 as a function of the correction value of the light illumination amount to be determined according to this difference δ, that is, the correction value $\Delta V_H$ of the firing voltage of the halogen lamp 3. In FIGS. 5 and 6, difference d corresponds to a fixed amount of light which is due to the fact that the original 2 is illuminated with light through a glass plate and is at a position far from the lamp while the standard white plate 1 is directly illuminated and is nearer to the lamp. Therefore, the actual difference between the reflected light amounts from the standard white plate 1 and the original 2 becomes δ'. However, as shown in FIG. 7, if the curve of the correction value is determined in consideration of the difference d, no problem occurs due to the difference d. Output a is an output corresponding to the reflected light from the standard white plate 1. Output b is an output corresponding to the reflected light from a white paper sheet as the original. Output c is an average output corresponding to the reflected light from the original 2. Output d is an output corresponding to the reflected light from the brightest portion (background) of the original 2.

When averaging the measurement of the original is performed as in the case shown in FIG. 1, the value of the difference δ of the reflected light amounts becomes slightly darker than the background. Therefore, the correction value $\Delta V_H$ is slightly decreased as seen from a solid line B in FIG. 7. When measurement for the original 2 is performed with a higher resolution, as in the case of FIG. 2, background discrimination can be performed. Therefore, as may be seen from a dotted curve C in FIG. 7, the correction value $\Delta V_H$ is directly corrected. As shown in FIG. 6, the method of finely measuring the light amount reflected from the original 2 has an advantage in good detection of background density. However, when this method is used for an original obtained by adhering a newspaper article on a white paper sheet, the exposure light amount supplied to the photosensitive drum 8 is automatically controlled in accordance with the amount of light reflected from the white background of the original. For this reason, the image density at the newspaper article portion becomes too dark. In such a case, a method of averaging the original density as shown in FIG. 5 is more suitable.

Figure 8:
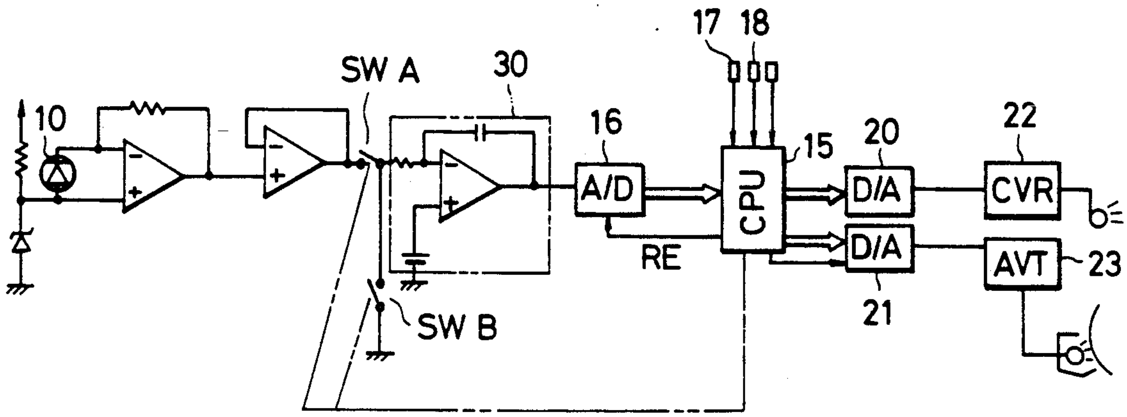
FIGS. 8 and 9 are block diagrams of a circuits for correcting the developing bias voltage and the lamp light amount.
Figure 9:
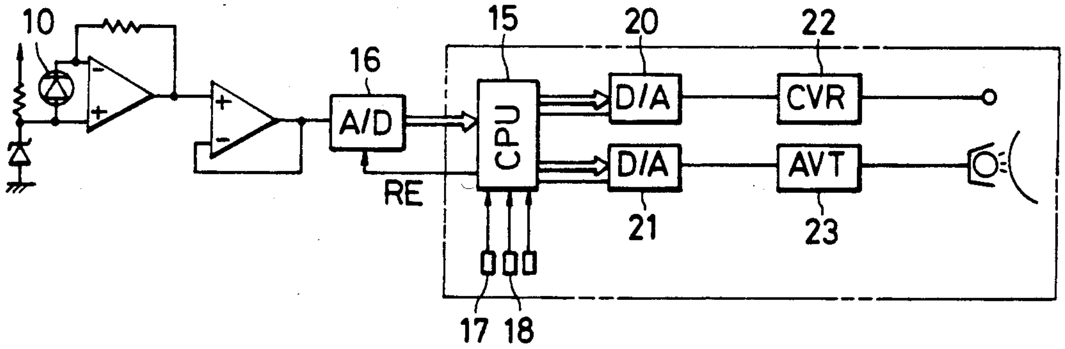

As shown in FIGS. 8 and 9, instead of the light exposure amount, the developing bias voltage can be corrected in accordance with the difference between the amounts of light reflected from the standard white plate 1 and the original 2 which are measured by the photosensor 10. Furthermore, the charging amount can alternatively be controlled.

FIG. 8 is a block diagram showing the circuit configuration for detecting the original density by integrating an output from the photosensor 10 for a predetermined period of time. A central processing unit (CPU) 15 receives, through an A/D converter 16 and an integration circuit 30, an output voltage from the photosensor 10 corresponding to the difference between the reflected light amounts. Signal sources 17 and 18 are for discriminating between reflected light from the standard white plate 1 and that from the original 2 by detecting the position of the mirror 4 in each scanning. This may be performed by arranging a sensor such as a microswitch in the travel path of the mirror 4. A light exposure amount control circuit (CVR) 22 for controlling the light amount of the halogen lamp 3 and a developing bias transformer (AVT) for generating a bias voltage for a developing unit 12 are connected to the CPU 15 through D/A converters 20 and 21, respectively. Switches SWA and SWB are turned on/off in accordance with signals from the CPU 15. When the switch SWA is turned on and the switch SWB is turned off in accordance with the signals from the CPU 15, the output from the photosensor 10 is integrated by the integration circuit 30. When the CPU 15 produces a signal RE, it is converted into a digital signal by the A/D converter 16, and the digital signal is supplied to the CPU 15. The CPU 15 determines if the input data corresponds to the standard white plate 1 or the original 2 in accordance with the signals from the signal sources 17 and 18. Then, the difference between the data corresponding to the standard white plate 1 and the original 2 is calculated by the CPU 15. The CPU 15 produces control data through the D/A converter 20 or 21 so as to control the light exposure amount or the developing bias voltage.

Figure 12:
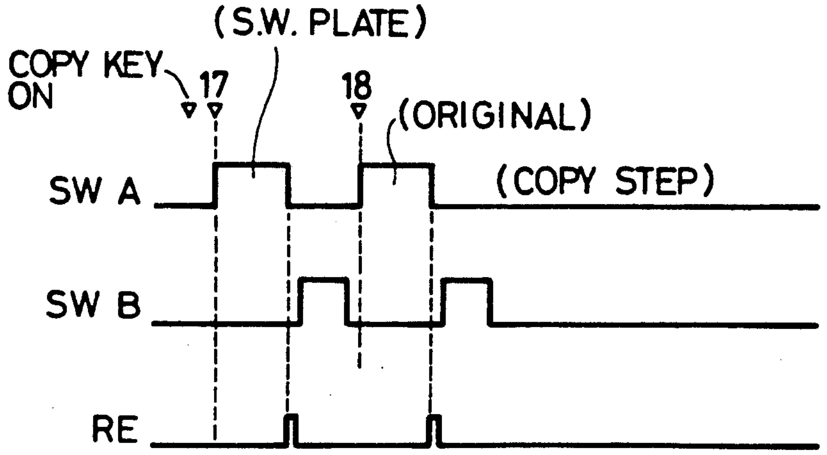
FIG. 12 is a timing chart of signals.

When the switch SWA is turned off and the switch SWB is turned on, the integration circuit 30 is reset. FIG. 12 shows the timing chart for this operation.

FIG. 9 shows a block diagram of a circuit for supplying an output from the photosensor 10 directly to the A/D converter 16 without going via the integration circuit 30. The same reference numerals as used in FIG. 8 denote the same parts in FIG. 9.

The circuit configuration shown in FIG. 8 is applicable to a copying machine having the construction shown in FIG. 1 or 2. However, the circuit shown in FIG. 9 is applicable only to a copying $V_L$ machine having the construction shown in FIG. 2.

Figure 10:
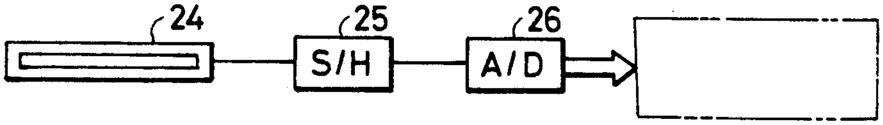
FIG. 10 is a block diagram of a circuit in which a linear image sensor is used as a photosensor.
Figure 11:
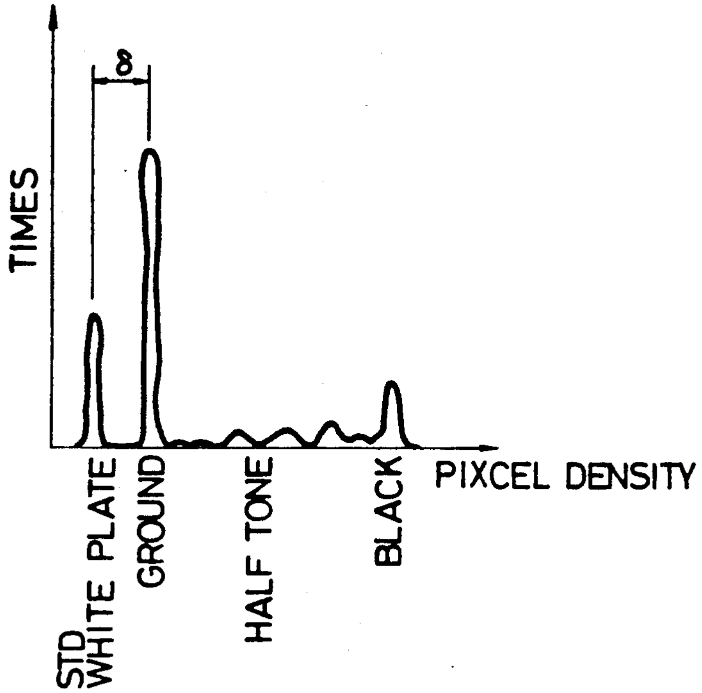
FIG. 11 shows a histogram showing the frequency of occurrence of image densities in accordance with the pixel data from the linear image sensor.

The photosensor can be a linear image sensor such as a CCD. FIG. 10 shows a block diagram wherein a linear image sensor is used. An output from a linear image sensor 24 having a width along the longitudinal direction of a slit is supplied to the CPU 15 through a threshold circuit 25 and an A/D converter 26. Since the remaining details of the circuit are the same as those of the circuit surrounded by the dotted line in FIG. 9, they will not be described. When the linear image sensor 24 is used, pixel data is obtained from the entire region of the original 2. On the basis of the obtained pixel data, the CPU 15 can calculate a histogram showing the frequency of occurrence of the pixel densities, as shown in FIG. 11. Then, according to a statistical process, discrimination between the standard white plate 1 and the background of the original 2 is performed, and the AE correction value can be determined in accordance with the $V_L$ control. Thus, as shown in FIG. 11, a first maximum output corresponding to the brightest portion is discriminated to correspond to the standard white plate 1. A second maximum output is discriminated to correspond to the background of the original. The AE correction value $\delta$ can be corrected in accordance with the difference between the first and second maximum outputs. The frequency of occurrence plotted in the histogram may be replaced with a probability density function.

The means for automatically controlling the image density can correct the light exposure amount or the developing bias voltage.

Note that the original density may be read from the entire original or only part thereof. Furthermore, the copying operation can be performed while also performing AE control.

In an image formation apparatus wherein image data is read by a linear image sensor such as a CCD and the image data is digitally processed, the sensor for reading the image data can also be used to detect the amounts of light from a standard member and an original, and the image density can be automatically controlled in accordance with the output from the sensor. In this case, a threshold level for digitizing the image data may, for example, be controlled for image density control.

In summary, according to the present invention, a photodetector measures the amount of light reflected from a standard white plate and that from an original, and the image density is controlled in accordance with the difference between the measured amounts of light. For this reason, control precision is high. Further $V_L$ more, since the automatic control of the image density is performed during standardization of image formation conditions, the production of the first copy is not delayed.

What is claimed is:

1. An image formation apparatus comprising:

image forming means for forming on a recording medium an image corresponding to an original, wherein said image forming means includes exposure-scanning means for exposure-scanning the original and developing means for forming a visual image on said recording medium;

pre-rotation means for stabilizing a static electric charge on the surface of said recording medium by preliminarily rotating said recording medium in response to a starting instruction for an image forming operation prior to the image forming operation;

potential control means for determining a process condition used for image formation, and for setting the surface potential of said recording medium at a predetermined value prior to the forming operation and after the operation performed by said pre-rotation means;

detecting means for detecting an amount of light from the original exposed by said exposure-scanning means and for outputting a density signal; and control means which respond to the starting instruction for the image forming operation, for causing a density measurement operation and the operation performed by said pre-rotation means to be performed in parallel, whereby during said density measurement operation, said exposure-scanning means is caused to pre-scan and derive a histogram from the density values of the original using the density signal provided by said detecting means, wherein said control means controls a parameter used to determine the density of a reproduced image on the basis of said histogram.

2. An image formation apparatus according to claim 1, wherein said detecting means comprises a photodetector arranged at a position which is slightly deviated from an imaging light path for the recording medium.

3. An image formation apparatus according to claim 2, further comprising an optical system through which said imaging light and detected light are passed, and wherein said photodetector is displaced at a position in focus with respect to said optical system.

4. An image formation apparatus according to claim 2, further comprising an optical system through which said imaging light and detected light are passed, and wherein said photodetector is displaced at a position out of focus with respect to said optical system.

5. An image formation apparatus according to claim 4, further comprising an integration circuit for integrating an output from said photodetector during a predetermined time duration.

6. An image formation apparatus according to claim 5, further comprising means for detecting the positions of said standard member and of said original, wherein an output from said integration circuit is sampled at a time after a predetermined time measured from the time of detection of the position of said standard member and after a predetermined time measured from the time of detection of the position of said original.

7. An image formation apparatus according to claim 1, wherein said control means controls a bias voltage of said developing means.

8. An image formation apparatus according to claim 1, wherein said image forming means has exposure means for exposing the original, and said control means controls an amount of light emitted from said exposure means.

9. An image formation apparatus according to claim 1, wherein said detecting means further detects an amount of light from a standard member having a predetermined image density.

10. An image formation apparatus according to claim 9, wherein said control means controls said image forming means in accordance with a difference between the amounts of light from said standard member and the original.

11. An image formation apparatus according to claim 10, wherein the amount of light from said standard member or the amount of light from the original is an amount of light reflected from said standard member or an amount of light reflected from the original.

12. An image formation apparatus according to claim 1 wherein, said potential control means determines said process condition such that said predetermined value is a surface potential at the time when a dark-portion image has been formed on said recording medium.

13. An image formation apparatus according to claim 12, wherein said potential control means controls means for charging said recording medium.

14. An image formation apparatus according to claim 1, wherein said potential control means determines said process condition such that said predetermined value is a surface potential at the time when a bright-portion image has been formed on said recording medium.

15. An image formation apparatus according to claim 14, wherein said potential control means controls an amount of exposure-light from said exposure-scanning means.

16. An image formation apparatus according to claim 1, wherein said control means controls an amount of light emitted from said exposure-scanning means.

17. An image formation apparatus according to claim 1, wherein said potential control means determines an amount of exposing light from said exposure-scanning means such that said predetermined value is a surface potential at the time when a bright-portion image has been formed on said recording medium after completion of operation of said pre-rotation means.

18. An image information apparatus according to claim 17, wherein said control means modifies said amount of exposing light determined by said potential control means in response to a difference between a density represented by said density signal output from said detecting means and a reference density, wherein said exposure-scanning means exposes said original with said amount of exposing light modified said original for image formation.

19. An image formation apparatus according to claim 18, further comprising a reference density member for representing a reference density.

20. An image formation apparatus according to claim 18, wherein said bright-portion image is formed by said reference density member.

21. An image formation apparatus comprising:

image forming means for forming on a recording medium an image corresponding to an original, wherein said image forming means includes exposure-scanning means for exposure-scanning the original and developing means for forming a visual image on said recording medium;

pre-rotation means for stabilizing a static electric charge on the surface of said recording medium by preliminarily rotating said recording medium in response to a starting instruction for an image forming operation prior to the image forming operation;

detecting means for detecting an amount of light from the original exposed by said exposure-scanning means and for outputting a density signal; and control means which respond to the starting instruction for the image forming operation, for causing a density measurement operation and the operation performed by said pre-rotation means to be performed in parallel, whereby during said density measurement operation, said exposure-scanning means is caused to pre-scan and derive a histogram from the density values of the original using the density signal provided by said detecting means, wherein said control means controls a parameter used to determine the density of a reproduced image on the basis of said histogram.

22. An apparatus according to claim 21, wherein said detecting means further detects an amount of light from a standard member having a predetermined image density.

23. An apparatus according to claim 22, wherein said control means controls said image forming means in accordance with a difference between the amounts of light from said standard member and the original.

24. An apparatus according to claim 21, wherein said detecting means comprises a photodetector arranged at a position which is slightly deviated from an imaging light path for the recording medium.

25. An apparatus according to claim 24, further comprising an optical system through which said imaging light and detected light are passed, and wherein said photodetector is displaced at a position out of focus with respect to said optical system.

26. An apparatus according to claim 24, further comprising an optical system through which said imaging light and detected light are passed, and wherein said photodetector is displaced at a position in focus with respect to said optical system.

27. An apparatus according to claim 24, further comprising an integration circuit for integrating an output from said photodetector during a predetermined time duration, wherein said photodetector detects an amount of light from a standard member having a predetermined density.

28. An apparatus according to claim 27, further comprising means for detecting the positions of said standard member and of said original, wherein an output from said integration circuit is sampled at a time after a predetermined time measured from the time of detection of the position of said standard member and after a predetermined time measured from the time of detection of the position of said original.

* * * * *

UNITED STATES PATENT AND TRADEMARK OFFICE
CERTIFICATE OF CORRECTION

PATENT NO. : 5,107,300

DATED : April 21, 1992

INVENTOR(S) : Hiroyuki Miyake, et al.

It is certified that error appears in the above-identified patent and that said Letters Patent is hereby corrected as shown below:

COLUMN 2

Line 10, "a machine" should read --a copying machine--; and
Line 2, page 24, "a" should be deleted.

COLUMN 4

Line 67, "$V_L$" should be deleted.

COLUMN 5

Line 50, "Further $V_L$" should read --Furthermore,--; and
Line 51, "more," should be deleted.

COLUMN 6

Line 4, "the" should read --the image--; and
Line 43, "said" should read --a--.

UNITED STATES PATENT AND TRADEMARK OFFICE
CERTIFICATE OF CORRECTION

PATENT NO. : 5,107,300 Page 2 of 2

DATED : April 21, 1992

INVENTOR(S) : Hiroyuki Miyake, et al.

It is certified that error appears in the above-identified patent and that said Letters Patent is hereby corrected as shown below:

COLUMN 7

Line 4, "1 wherein," should read --1, wherein--;
Line 37, "said original for image formation" should read --by said control means--; and
Line 43, "18," should read --19,--.

Signed and Sealed this

Twenty-second Day of March, 1994

Attest:

BRUCE LEHMAN

Attesting Officer

*Commissioner of Patents and Trademarks*